(12) United States Patent
Douady et al.

(10) Patent No.: US 11,641,528 B2
(45) Date of Patent: *May 2, 2023

(54) METHOD AND APPARATUS FOR PARTIAL CORRECTION OF IMAGES

(71) Applicant: GoPro, Inc., San Mateo, CA (US)

(72) Inventors: Bruno César Douady, Orsay (FR); Guillaume Matthieu Guérin, Chatillon (FR); Eric Chasseur, Le Pacq (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/531,311

(22) Filed: Nov. 19, 2021

(65) Prior Publication Data

US 2022/0078312 A1 Mar. 10, 2022

Related U.S. Application Data

(63) Continuation of application No. 17/000,822, filed on Aug. 24, 2020, now Pat. No. 11,212,425.

(60) Provisional application No. 62/900,945, filed on Sep. 16, 2019.

(51) Int. Cl.
*H04N 5/217* (2011.01)
*H04N 5/232* (2006.01)

(52) U.S. Cl.
CPC ..... *H04N 5/2173* (2013.01); *H04N 5/232123* (2018.08)

(58) Field of Classification Search
CPC .. H04N 5/2173; H04N 5/232123; H04N 5/20; H04N 5/2258; H04N 5/23238; H04N 5/3572; H04N 5/217
See application file for complete search history.

(56) References Cited

U.S. PATENT DOCUMENTS

| 5,418,901 | A | 5/1995 | Omori | |
|---|---|---|---|---|
| 11,212,425 | B2* | 12/2021 | Douady | H04N 5/3572 |
| 2007/0153341 | A1* | 7/2007 | Kang | H04N 1/58 358/529 |
| 2009/0273843 | A1* | 11/2009 | Raskar | H04N 5/2254 348/241 |
| 2011/0242352 | A1* | 10/2011 | Hikosaka | H04N 5/3572 348/222.1 |
| 2012/0262493 | A1 | 10/2012 | Tsai | |
| 2014/0210844 | A1 | 7/2014 | Hullin | |
| 2014/0307963 | A1* | 10/2014 | Zimmer | G06T 3/4015 382/167 |
| 2017/0026592 | A1 | 1/2017 | Kuang | |
| 2019/0082154 | A1 | 3/2019 | Kang | |
| 2021/0084200 | A1 | 3/2021 | Douady | |

* cited by examiner

*Primary Examiner* — Luong T Nguyen
(74) *Attorney, Agent, or Firm* — Young Basile Hanlon & MacFarlane, P.C.

(57) ABSTRACT

An image capture device may include an image sensor, a processor, and memory. The image sensor may be configured to obtain an image. The processor may be configured to: generate a grid on the image forming tiles; determine a fringing level of each vertex of the vertices; sort all of the tiles based on the fringing level of each tile so that the tiles are sorted in a descending order from the tile with a highest of the fringing levels to the tile with a lowest of the fringing levels; and apply a fringing compensation to a subset of the sorted tiles to obtain a processed image. The memory may be configured to store the processed image.

20 Claims, 9 Drawing Sheets

METHOD AND APPARATUS FOR PARTIAL CORRECTION OF IMAGES

CROSS-REFERENCE TO RELATED APPLICATION

This application is a continuation of U.S. patent application Ser. No. 17/000,822, filed Aug. 24, 2020, which claims priority to and the benefit of U.S. Provisional Patent Application No. 62/900,945, filed Sep. 16, 2019, the entire disclosures of which are hereby incorporated by reference.

TECHNICAL FIELD

This disclosure relates to image capture devices and partial correction of images.

BACKGROUND

High performance video recording requires high pixel rate, complex algorithms, and high power consumption that cannot be delivered by typical cameras. These typical cameras include central processing units (CPU)s that cannot handle the complex algorithms required for high performance video recording, and attempting to implement the complex algorithms in such CPUs results in a video recording with poor image quality.

SUMMARY

Disclosed herein are implementations of partial correction of images. In an aspect, an image capture device may include an image sensor, a processor, and a memory. The image sensor may be configured to obtain an image. The processor may be configured to generate a grid on the image. The grid may include one or more vertices. The one or more vertices may be used to form tiles. The processor may be configured to determine a flare level of each vertex. The processor may be configured to assign a maximum flare level for each tile of the image. The processor may be configured to sort the tiles. The tiles may be sorted based on the maximum flare level of each tile. The processor may be configured to apply a flare compensation to a subset of the sorted tiles to obtain a processed image. The processed image may have reduced flare artifacts or no flare artifacts. The processed image may be stored in the memory.

In another aspect, a method may include obtaining an image. The method may include generating a grid on the image. The grid may include one or more vertices. The one or more vertices may be used to form tiles. The method may include determining a flare level on the one or more vertices. The method may include applying a flare compensation to a subset of the tiles to obtain a processed image.

In another aspect, an image capture device may include an image sensor, a processor, and a memory. The image sensor may be configured to obtain an image. The processor may be configured to determine a thumbnail image. The thumbnail image may be based on the image. The thumbnail image may include one or more thumbnail tiles. The processor may be configured to determine a contrast value of each thumbnail tile. The processor may be configured to sort the one or more thumbnail tiles. The one or more thumbnail tiles may be sorted based on the contrast value of each thumbnail tile. The processor may be configured to apply a compensation value to a subset of the sorted thumbnail tiles to obtain a processed image. The memory may be configured to store the processed image.

In yet another aspect, an image capture device may include an image sensor, a processor, and memory. The image sensor may be configured to obtain an image. The processor may be configured to: generate a grid on the image forming tiles; determine a fringing level of each vertex of the vertices; sort all of the tiles based on the fringing level of each tile so that the tiles are sorted in a descending order from the tile with a highest of the fringing levels to the tile with a lowest of the fringing levels; and apply a fringing compensation to a subset of the sorted tiles to obtain a processed image. The memory may be configured to store the processed image.

One aspect provides a method comprising: obtaining an image. Then generating a grid on the image, wherein the grid comprises vertices to form tiles. Determining fringing levels for the vertices. Finally, applying a fringing compensation to a subset of the tiles based on the fringing levels to obtain a processed image, wherein applying the fringing compensation includes forcing a zero-fringing compensation at an edge between a first tile and a second tile of the tiles.

Another aspect provides an image capture device comprising: an image sensor, a processor, and memory. The image sensor is configured to obtain an image. The processor is configured to: determine a thumbnail image based on the image, wherein the thumbnail image comprises thumbnail tiles; determine a saturation value of each thumbnail tile; sort all of the thumbnail tiles based on the saturation value of each thumbnail tile in an ascending order from the thumbnail tile with a lowest saturation value to the thumbnail tile with a highest saturation value; and apply a correction to a subset of the sorted thumbnail tiles to obtain a processed image. The memory is configured to store the processed image.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Implementations disclosed herein may include processing a portion of an image instead of the entire image to increase processing speed and efficiency without reducing image quality. Since some image artifacts only affect a small portion of the image, the implementations described herein determine which pixels of the image would benefit the most from processing without sacrificing image quality. The implementations described herein may be applied to any type of image correction, for example, flare compensation, blue-fringing correction, and local tone mapping (LTM).

Figure 1A:
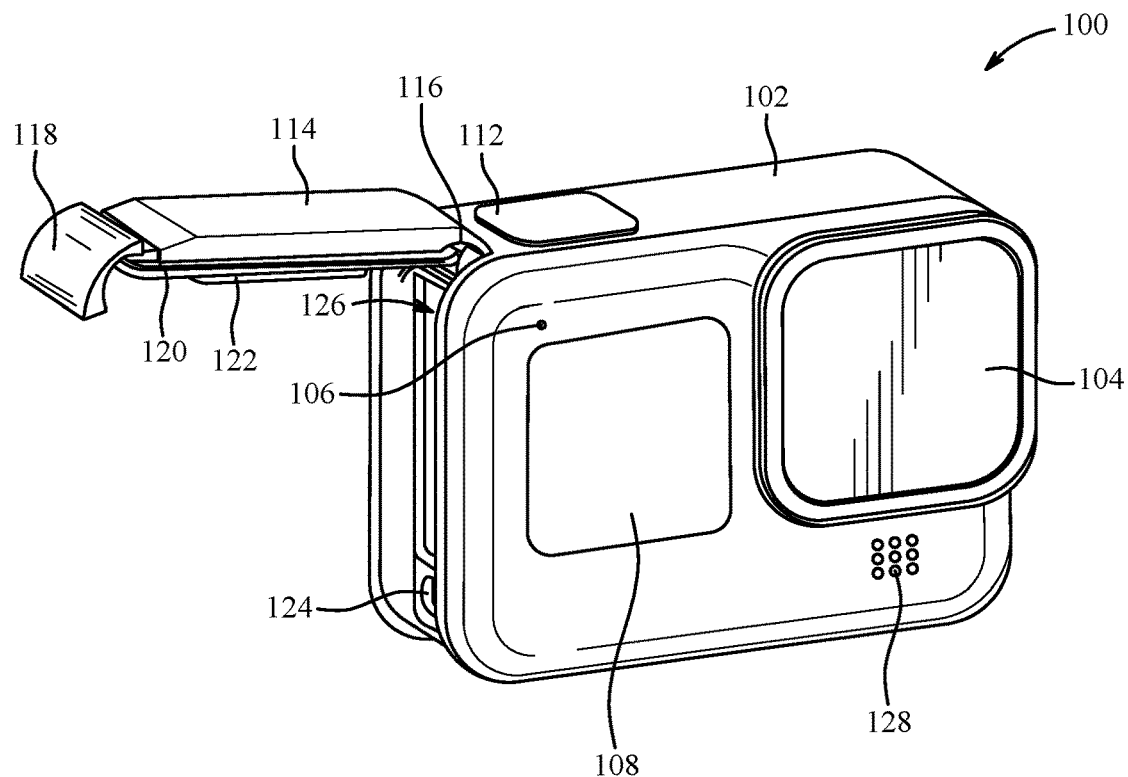
FIGS. 1A-B are isometric views of an example of an image capture device.
Figure 1B:
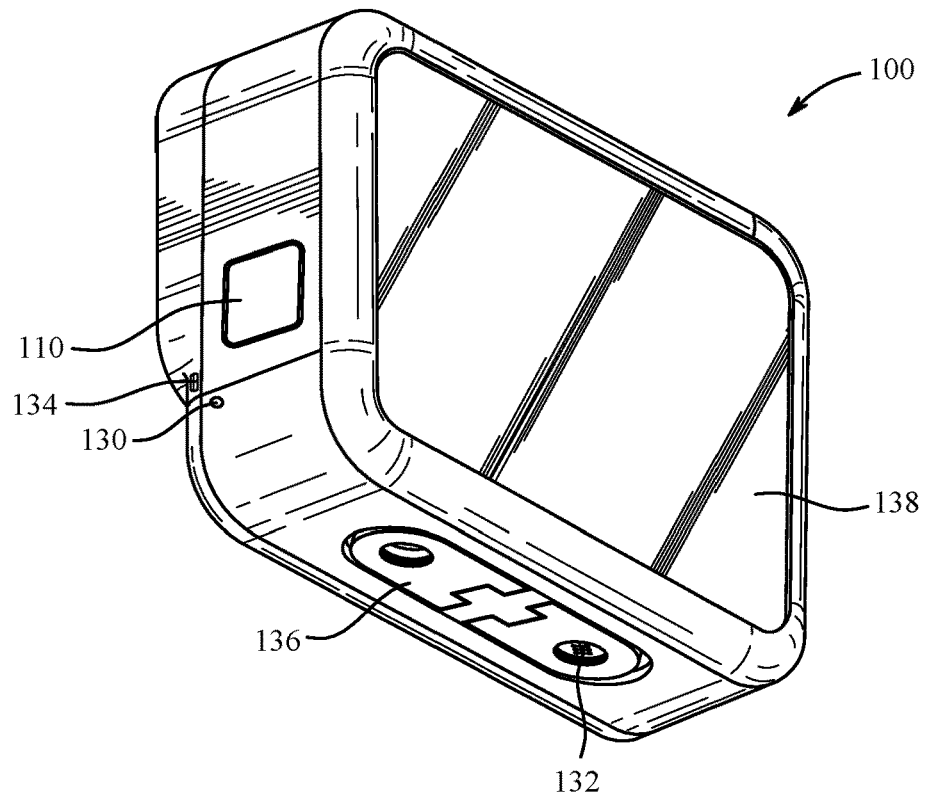

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 4:
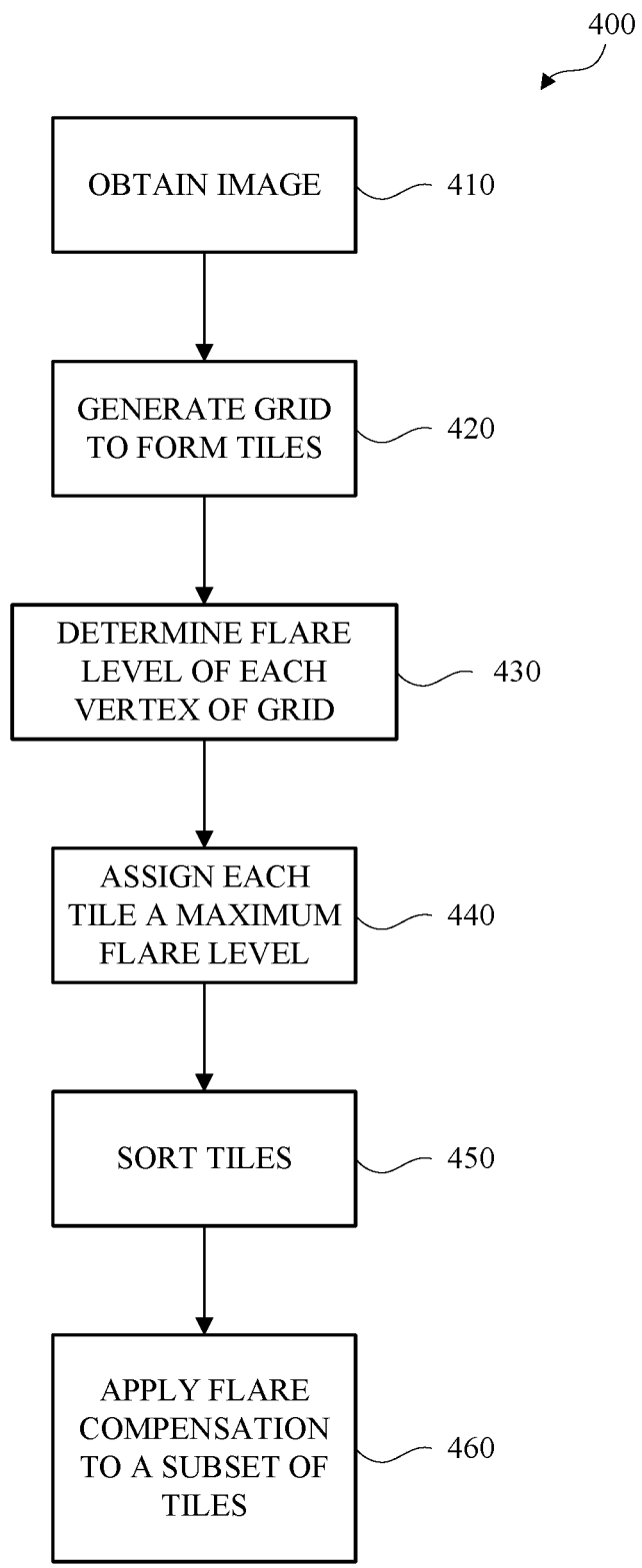
FIG. 4 is a flow diagram of an example of a method for flare compensation in accordance with embodiments of this disclosure.

The image capture device 100 may be used to implement some or all of the methods described in this disclosure, such as the method 400 described in FIG. 4.

Figure 2A:
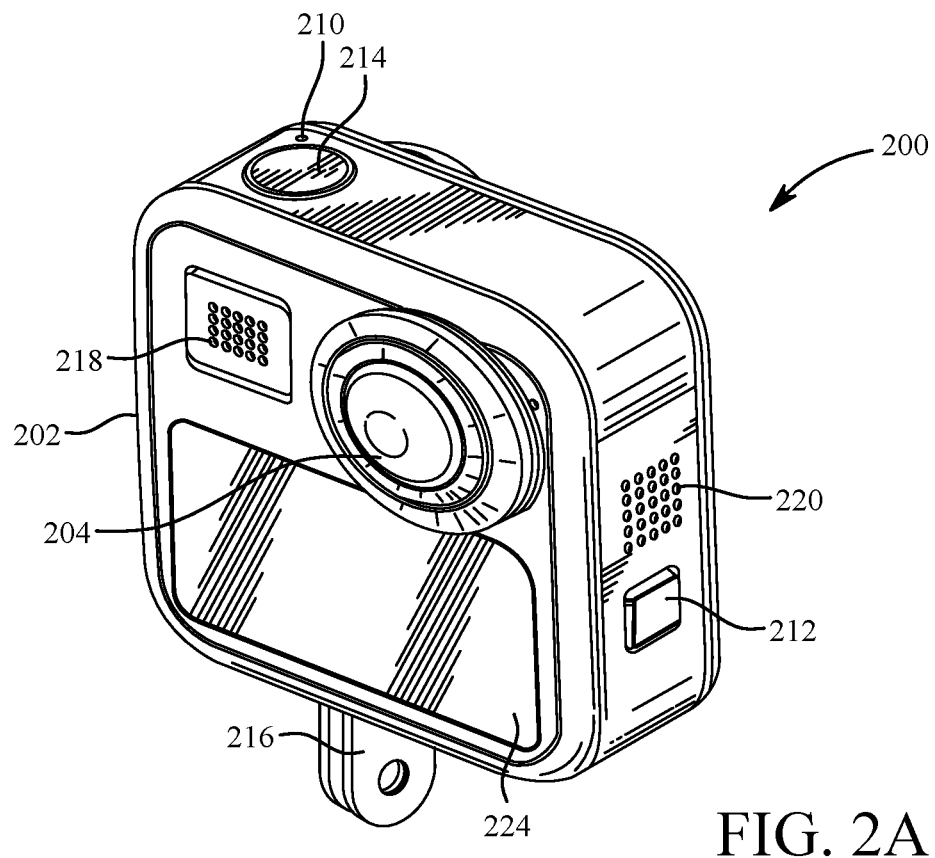
FIGS. 2A-B are isometric views of another example of an image capture device.
Figure 2B:
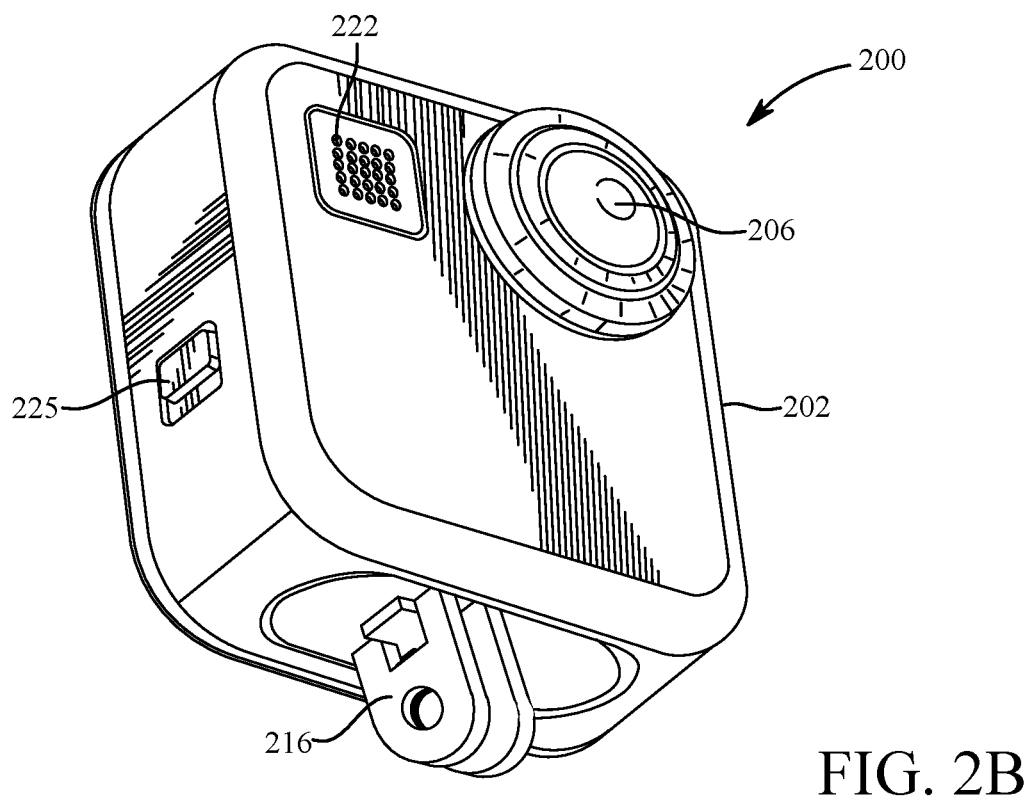

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2C:
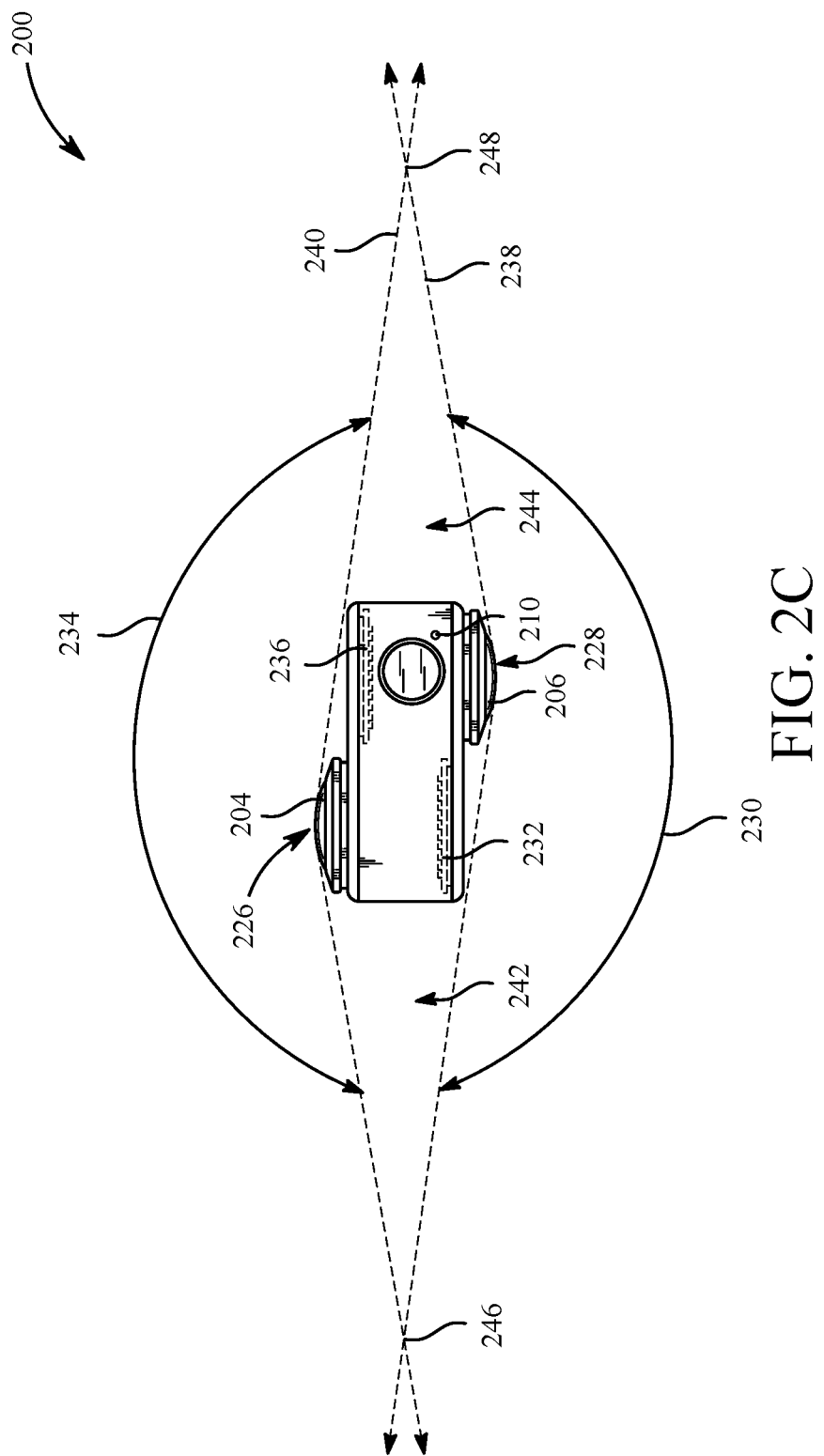
FIG. 2C is a cross-sectional view of the image capture device of FIGS. 2A-B.
Figure 2D:
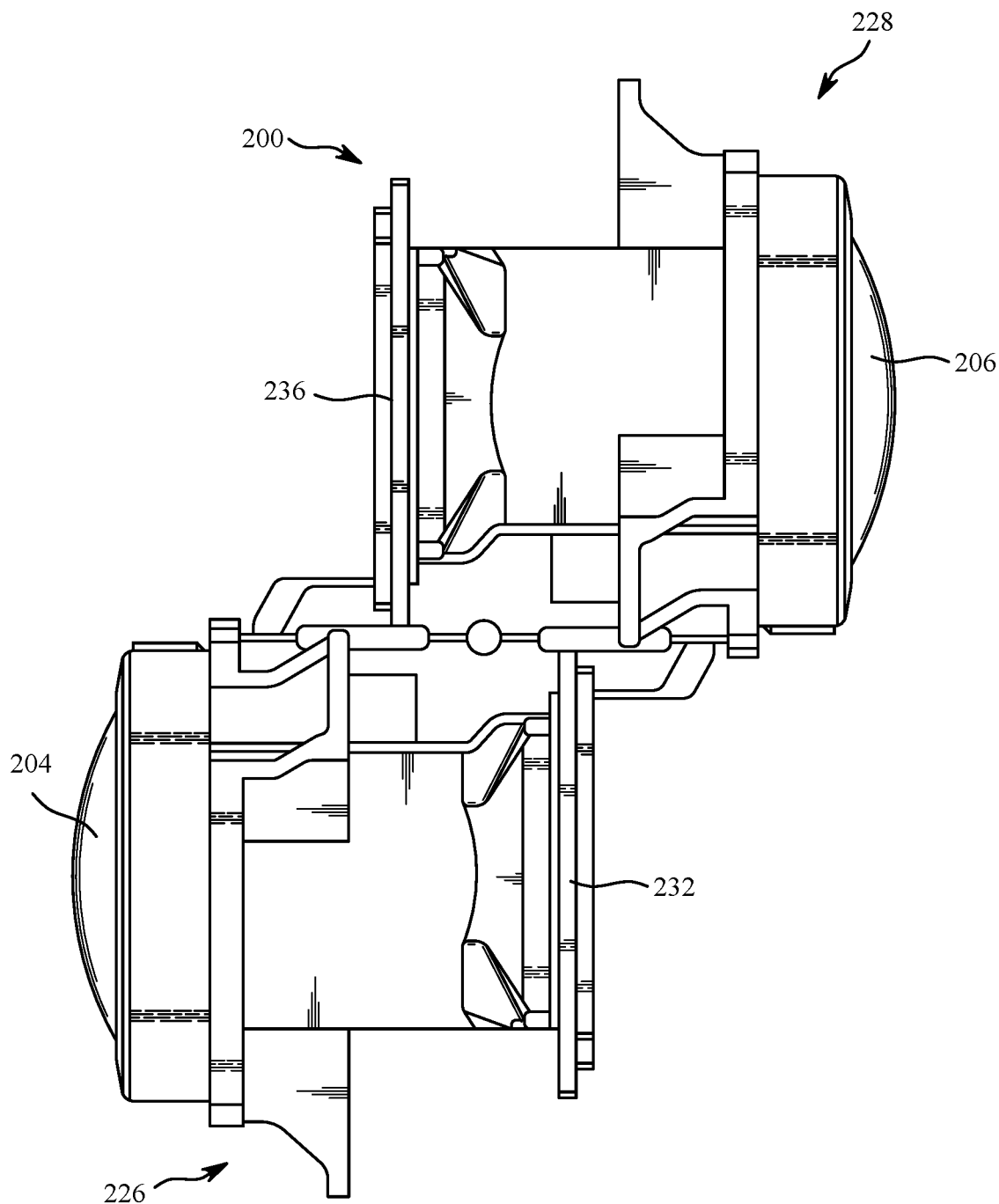
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

The image capture device 200 may be used to implement some or all of the methods described in this disclosure, such as the method 400 described in FIG. 4.

Figure 3:
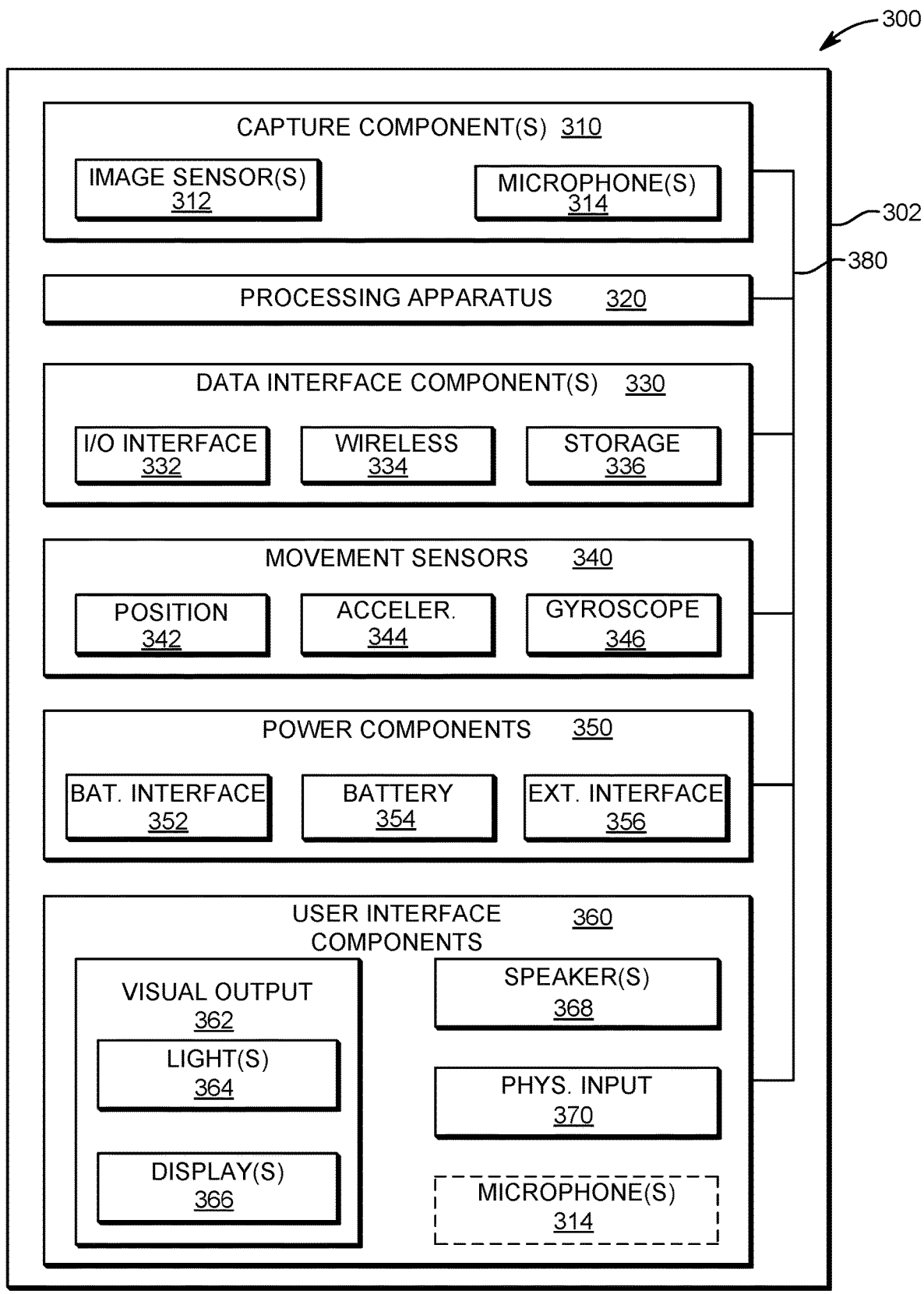
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the methods described in this disclosure, such as the method 400 described in FIG. 4.

FIG. 4 is a flow diagram of an example of a method 400 for flare compensation in accordance with embodiments of this disclosure. As shown in FIG. 4, the method 400 includes obtaining 410 an image via an image sensor. The method 400 includes generating 420 a grid on the image. The intersection of the lines of the grid may be referred to as vertices. The lines of the grid may be used to partition the image into tiles (e.g., blocks), and each corner of a tile corresponds to a vertex of the grid. Accordingly, each tile comprises 4 vertices. Adjacent tiles share two vertices. The image may comprise any number of tiles, and the tiles may be of any size. For example, each tile of the image may be 4 pixels×4 pixels, 16 pixels×16 pixels, 32 pixels×32 pixels, 64 pixels×64 pixels, or any other suitable dimension. The tiles are not limited to square tiles and may be of any shape and have any number of vertices. For example, tiles may be triangular, hexagonal, octagonal, or any other shape or size. In some embodiments, the image may be partitioned into multiple tile shapes, sizes, or both.

The method 400 includes determining 430 a flare level of each vertex of the grid. The flare level may be determined using any flare compensation algorithm. The determined flare level may be a level of flare that is to be suppressed, and it may be a field dependent value to subtract from the pixel values. The flare level may correspond to the amount of flare compensation to be applied to a tile.

The method 400 includes assigning 440 each tile a maximum flare level value. The maximum flare level value assigned to a tile may be the flare value of the vertex of that tile that has the highest value. In an example where the flare value of the first vertex of a tile is 10, the flare value of the second vertex of the tile is 7, the flare value of the third vertex of the tile is 8, and the flare value of the fourth vertex of the tile is 5, the tile may be assigned a flare value of 10 since 10 is the highest flare value of the 4 vertices.

The method 400 includes sorting 450 the tiles. The sorting 450 of the tiles may include ranking each tile by the amplitude of correction needed. The tiles may be sorted according to their respective maximum flare levels. For example, the tiles may be sorted in descending order from the tile with the highest maximum flare level to the tile with the lowest maximum flare level.

The method 400 includes applying 460 flare compensation to a subset of the tiles to obtain a processed image. The flare compensation may be applied using linear interpolation. The processed image may be stored in a memory, transmitted to another device, displayed on one or more displays, or any combination thereof. The flare compensation applied to the subset of tiles may be a level of flare to be subtracted from the pixel values. The subset of tiles may be selected based on a percentage. For example, the subset of tiles may be 25% of the total number of tiles. In other examples, the subset of tiles may be 30%, 40%, 50%, or any other percentage. The percentage may be determined based on the amount of flare detected in the image.

Since the flare compensation is only applied to a subset of the tiles, the tiles that are not included in the subset remain unprocessed (i.e., non-compensated) with respect to flare. Accordingly, a continuity artifact may be formed at the boundary of a processed tile and a non-processed tile. In an example to avoid producing a continuity artifact, the flare value at the boundary of the processed tile and the non-processed tile may be forced to zero such that no flare compensation is performed at the boundary to ensure pixel value continuity between the two tiles. For example, the flare value may gradually be forced to zero as the boundary between the processed tile and the non-processed tile approaches such that no flare compensation is performed at the boundary to ensure pixel value continuity between the two tiles.

Figure 5A:
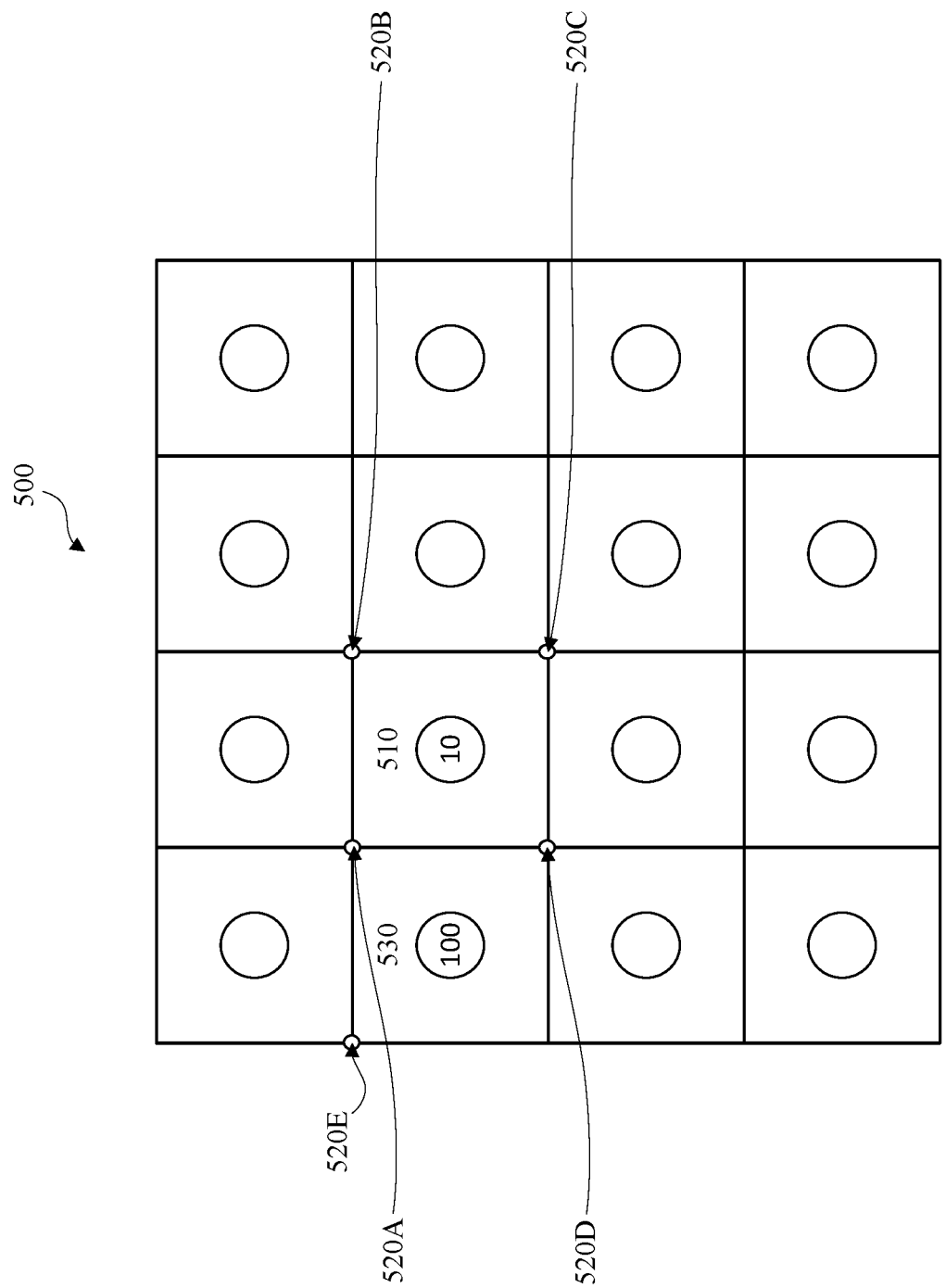
FIG. 5A is a block diagram of a tiled image in accordance with embodiments of this disclosure.

FIG. 5A is a block diagram of a tiled image 500 in accordance with embodiments of this disclosure. An image is partitioned using a grid to obtain the tiled image 500. The intersection of the lines of the grid may be referred to as vertices. The lines of the grid may be used to partition the image into tiles (e.g., blocks), and each corner of a tile corresponds to a vertex of the grid. Accordingly, each tile comprises 4 vertices. The tiled image 500 may include any number of tiles, for example 16 tiles, as shown in FIG. 5A. The tiles are shown as square tiles for simplicity and may be of any shape and have any number of vertices. For example, tiles may be triangular, hexagonal, octagonal, or any other shape or size. In some embodiments, the image may be partitioned into multiple tile shapes, sizes, or both.

As shown in FIG. 5A, tile 510 includes a first vertex 520A, a second vertex 520B, a third vertex 520C, and a fourth vertex 520D. The first vertex 520A corresponds to the top-left corner of the tile 510. The second vertex 520B corresponds to the top-right corner of the tile 510. The third vertex 520C corresponds to the bottom-right corner of the tile 510. The fourth vertex 520D corresponds to the bottom-left corner of the tile 510. As shown in FIG. 5A, the first vertex 520A is shared with the top-right corner of tile 530, and the fourth vertex 520D is shared with the bottom-right corner of tile 530.

In this example, the first vertex 520A may have a flare value of 10, the second vertex 520B may have a flare value of 7, the third vertex 520C may have a flare value of 8, and the fourth vertex 520D may have a flare value of 5. Based on the respective flare values of the first vertex 520A, the second vertex 520B, the third vertex 520C, and the fourth vertex 520D, the tile 510 may be assigned a flare value of 10 since 10 is the highest flare value of the 4 vertices. In this example, the flare value of the top-left corner of tile 530 (i.e., vertex 520E) may be 100. Accordingly, tile 530 is shown to be assigned a flare value of 100 in this example.

Figure 5B:
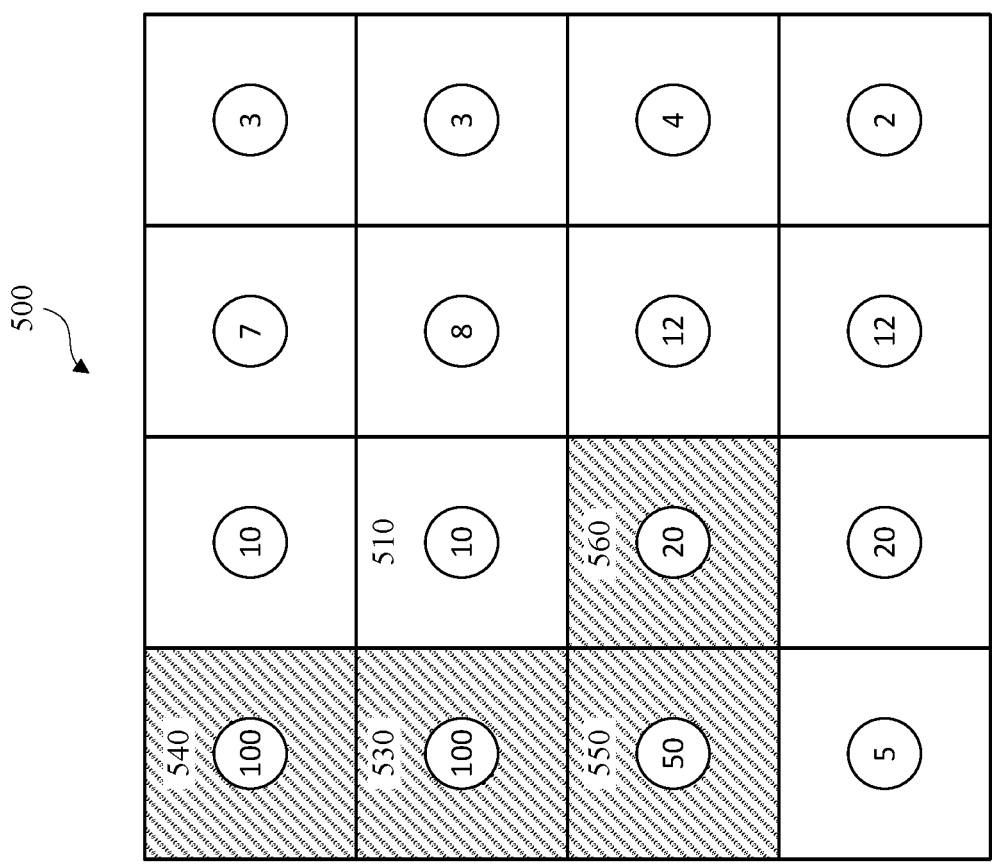
FIG. 5B is a block diagram of the tiled image of FIG. 5A showing selected tiles for flare compensation.

FIG. 5B is a block diagram of the tiled image 500 of FIG. 5A showing selected tiles for flare compensation. The flare values for each tile are shown in the circles of the respective tile. As shown in FIG. 5B, tile 530 has a flare value of 100, tile 540 has a flare value of 100, tile 550 has a flare value of 50, and tile 560 has a flare value of 20.

Since flare is typically generated by a localized high-power light source (e.g., the sun), most of the time, only a small part of the image may be affected by a flare artifact. In many cases, flare artifacts may affect less than 25% of an image. Accordingly, it would be inefficient and costly to process all the pixels of the image when less than 25% of the image is affected by the flare artifacts. In accordance with embodiments of this disclosure, a subset of tiles are selected to increase processing speed and efficiency. In this example, the top 25% of the highest flare value of tiles are selected as the subset of tiles for flare compensation processing. As shown in FIG. 5B, tile 530, tile 540, tile 550, and tile 560 have the highest flare values ranging from 20 to 100 and are selected as the subset of the total tiles of the image for flare compensation.

As shown in FIG. 5B, flare compensation is applied to tile 530, tile 540, tile 550, and tile 560 to obtain a processed image. The flare compensation may be applied using linear interpolation from vertex to vertex. The flare compensation applied to this subset of tiles may be a level of flare to be subtracted from the pixel values. Since the flare compensation is only applied to a subset of the tiles, the tiles that are not included in the subset remain unprocessed (i.e., non-compensated) with respect to flare. The unprocessed tiles in this example are shown as non-shaded tiles in FIG. 5B. Accordingly, a continuity artifact may be formed at the boundary of a processed tile, such as tile 530, and a non-processed tile, such as tile 510. To avoid producing a continuity artifact, the flare value at the boundary of the tile 530 and the tile 510 may be forced to zero such that no flare compensation is performed at the boundary to ensure pixel value continuity between the two tiles. For example, the flare value may gradually be forced to zero as the boundary between the processed tile and the non-processed tile approaches such that no flare compensation is performed at the boundary to ensure pixel value continuity between the two tiles.

Local tone mapping (LTM) may be used to raise the contrast where it has been lowered during global tone mapping (GTM) processing. GTM processing may include applying a look up table (LUT) on each pixel value. GTM processing may decrease the contrast for pixels that have a value at a level for which the LUT has a slope less than 1. Accordingly, contrast compensation would be needed in this example.

Figure 6:
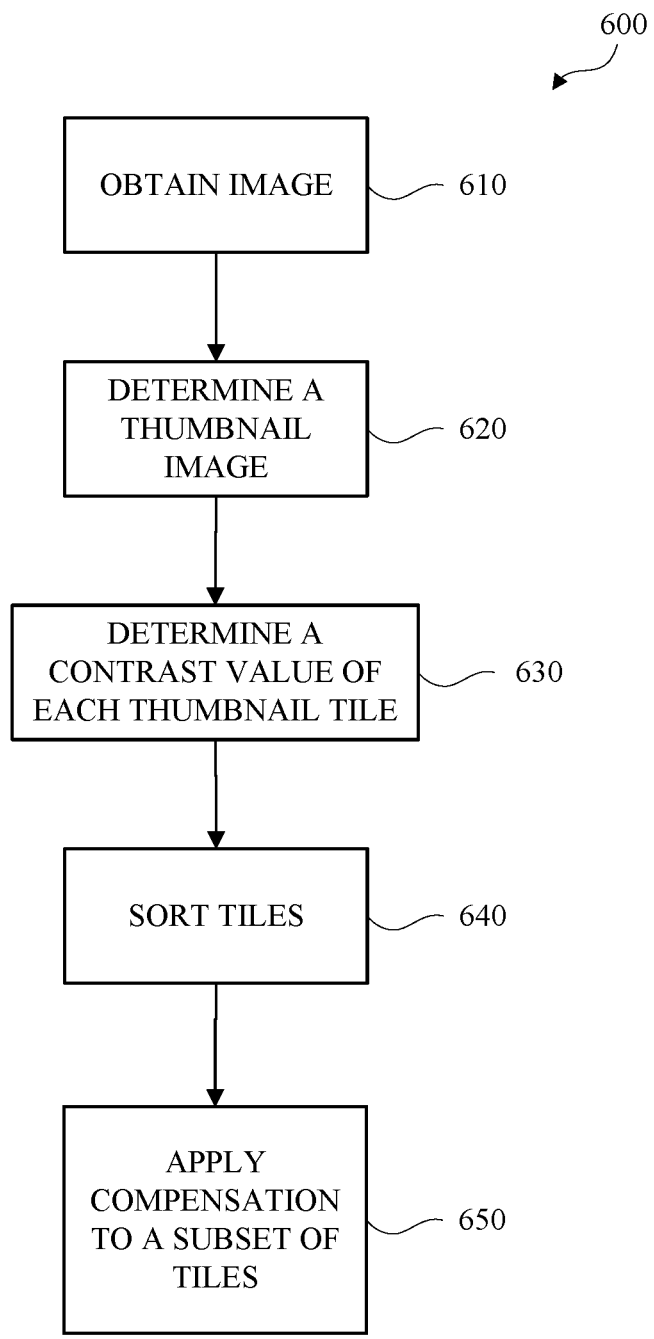
FIG. 6 is a flow diagram of an example of a method for contrast compensation in accordance with embodiments of this disclosure.

FIG. 6 is a flow diagram of an example of a method 600 for contrast compensation in accordance with embodiments of this disclosure. As shown in FIG. 6, the method 600 includes obtaining 610 an image via an image sensor. The method 600 includes determining 620 a thumbnail image based on the image. The thumbnail image may be based on a grid. The intersection of the lines of the grid may be referred to as vertices. The lines of the grid may be used to partition the image into thumbnail tiles (e.g., blocks), and each corner of a thumbnail tile corresponds to a vertex of the grid. Accordingly, each tile comprises 4 vertices. Adjacent tiles share two vertices. The image may comprise any number of thumbnail tiles, and the thumbnail tiles may be of any size. For example, each thumbnail tile of the image may be 4 pixels×4 pixels, 16 pixels×16 pixels, 32 pixels×32 pixels, 64 pixels×64 pixels, or any other suitable dimension. The tiles are not limited to square tiles and may be of any shape and have any number of vertices. For example, tiles may be triangular, hexagonal, octagonal, or any other shape or size. In some embodiments, the image may be partitioned into multiple tile shapes, sizes, or both.

The method 600 includes determining 630 a contrast value of each thumbnail tile using the vertices of the grid. The contrast value may be determined using any contrast compensation algorithm. The determined contrast value may be a level of contrast that is to be suppressed or enhanced, and it may be a field dependent value to add or subtract from the pixel values. The contrast value may correspond to the amount of contrast compensation to be applied to a tile.

Determining 630 the contrast value of each thumbnail tile may include assigning each tile a maximum contrast value. The maximum contrast value assigned to a tile may be the contrast value of the vertex of that tile that has the highest value. In an example where the contrast value of the first vertex of a tile is 10, the contrast value of the second vertex of the tile is 7, the contrast value of the third vertex of the tile is 8, and the contrast value of the fourth vertex of the tile is 5, the tile may be assigned a flare value of 10 since 10 is the highest flare value of the 4 vertices.

The method 600 includes sorting 640 the tiles. The sorting 640 of the tiles may include ranking each tile by the amplitude of correction needed. The tiles may be sorted according to their respective maximum contrast levels. For example, the tiles may be sorted in ascending order from the tile with the lowest maximum contrast value to the tile with the highest maximum contrast value.

The method 600 includes applying 650 contrast compensation to a subset of the tiles to obtain a processed image. The contrast compensation may be applied using linear interpolation. The processed image may be stored in a memory, transmitted to another device, displayed on one or more displays, or any combination thereof. The contrast compensation applied to the subset of tiles may be a level of contrast to be added or subtracted from the pixel values. The subset of tiles may be selected based on a percentage. For example, the subset of tiles may be 25% of the total number of tiles. In other examples, the subset of tiles may be 30%, 40%, 50%, or any other percentage.

Since the contrast compensation is only applied to a subset of the tiles, the tiles that are not included in the subset remain unprocessed (i.e., non-compensated) with respect to contrast correction. Accordingly, a continuity artifact may be formed at the boundary of a processed tile and a non-processed tile. In an example to avoid producing a continuity artifact, the contrast value at the boundary of the processed tile and the non-processed tile may be forced to zero such that no contrast compensation is performed at the boundary to ensure pixel value continuity between the two tiles. For example, the contrast compensation value may gradually be forced to zero as the boundary between the processed tile and the non-processed tile approaches such that no contrast compensation is performed at the boundary to ensure pixel value continuity between the two tiles.

The implementations described herein may be applied to blue-fringing correction. Blue-fringing occurs around saturated values and may appear around the sky around a tree. The implementations described herein may be adapted to determine regions of the image that may most benefit from blue-fringing correction. The blue-fringing correction may be determined from statistics used for an auto-exposure (AE) algorithm. The AE algorithm may include a count of saturated values per region or tile.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device comprising:
   an image sensor configured to obtain an image;
   a processor configured to:
   generate a grid on the image, forming tiles;
   determine a fringing level of each vertex of vertices of the tiles;
   sort all of the tiles based on the fringing level of each tile so that the tiles are sorted in a descending order from the tile with a highest of the fringing levels to the tile with a lowest of the fringing levels; and
apply a fringing compensation to a subset of the sorted tiles to obtain a processed image; and
a memory configured to store the processed image.

2. The image capture device of claim 1, wherein each vertex corresponds to a corner of at least one tile.

3. The image capture device of claim 1, wherein each tile comprises four vertices.

4. The image capture device of claim 3, wherein a maximum fringing level for each tile corresponds with a highest fringing level of the four vertices.

5. The image capture device of claim 1, wherein the subset of the sorted tiles is based on a percentage of a total number of tiles, and the percentage is 25 percent.

6. The image capture device of claim 1, wherein the fringing level is a blue-fringing correction.

7. The image capture device of claim 1, wherein the processor is configured to apply the fringe compensation using a linear interpolation.

8. The image capture device of claim 7, wherein the processor is configured to force a zero fringing compensation at an edge between a first tile and a second tile.

9. The image capture device of claim 8, wherein the first tile is included in the subset of the sorted tiles and the second tile is excluded from the subset of the sorted tiles.

10. The image capture device of claim 1, wherein each tile is 32 pixels×32 pixels.

11. A method comprising:
obtaining an image;
generating a grid on the image, wherein the grid comprises vertices to form tiles;
determining fringing levels for the vertices;
applying a fringing compensation to a subset of the tiles based on the fringing levels to obtain a processed image, wherein applying the fringing compensation includes forcing a zero-fringing compensation at an edge between a first tile and a second tile of the tiles.

12. The method of claim 11 further comprising:
assign a maximum fringe level for each tile.

13. The method of claim 11 further comprising:
sorting the tiles based on a maximum fringe level of each tile.

14. The method of claim 11, wherein the subset of tiles is based on a percentage of a total number of tiles.

15. The method of claim 11, wherein the fringing is blue fringing.

16. The method of claim 15, wherein the first tile is included in the subset of tiles and the second tile is excluded from the subset of tiles.

17. An image capture device comprising:
an image sensor configured to obtain an image;
a processor configured to:
determine a thumbnail image based on the image, wherein the thumbnail image comprises thumbnail tiles;
determine a saturation value of each thumbnail tile;
sort all of the thumbnail tiles based on the saturation value of each thumbnail tile in an ascending order from the thumbnail tile with a lowest saturation value to the thumbnail tile with a highest saturation value; and
apply a correction to a subset of the sorted thumbnail tiles to obtain a processed image; and
a memory configured to store the processed image.

18. The image capture device of claim 17, wherein the processor is further configured to force a zero compensation value at an edge between a first tile and a second tile.

19. The image capture device of claim 18, wherein the first tile is included in the subset of the sorted thumbnail tiles and the second tile is excluded from the subset of the sorted thumbnail tiles.

20. The image capture device of claim 17, wherein the processor is further configured to count saturated values per tile.

* * * * *